United States Patent
Joubert

(10) Patent No.: US 6,703,622 B2
(45) Date of Patent: Mar. 9, 2004

(54) SCINTILLATION OPTICAL FIBRE DEVICE FOR COLLECTING IONIZING RADIATION

(75) Inventor: Henri Joubert, Condat sur Vienne (FR)

(73) Assignee: Dimason, Paris (FR)

( * ) Notice: Subject to any disclaimer, the term of this patent is extended or adjusted under 35 U.S.C. 154(b) by 0 days.

(21) Appl. No.: 10/279,970

(22) Filed: Oct. 25, 2002

(65) Prior Publication Data

US 2003/0098418 A1 May 29, 2003

Related U.S. Application Data

(63) Continuation of application No. PCT/FR01/01254, filed on Apr. 24, 2001.

(30) Foreign Application Priority Data

Apr. 25, 2000 (FR) .............................................. 00 05253

(51) Int. Cl.⁷ ................................................. G01T 1/20
(52) U.S. Cl. ............................... 250/483.1; 250/361 R; 250/362
(58) Field of Search ................... 250/370.11, 370.01, 250/208.1, 361 R, 362, 366, 367, 483.1

(56) References Cited

U.S. PATENT DOCUMENTS 4,788,436 A 11/1988 Koechner
5,399,869 A * 3/1995 Usuda ..................... 250/486.1
5,635,717 A 6/1997 Popescu

FOREIGN PATENT DOCUMENTS

EP 0 604 947 A1 7/1994

* cited by examiner

Primary Examiner—Constantine Hannaher
Assistant Examiner—Timothy Moran
(74) Attorney, Agent, or Firm—Young & Thompson

(57) ABSTRACT

A device (1) for collecting ionizing radiation comprises a scintillating optical fiber (4) received in an opaque sheath, having a first end (7) for receiving ionizing radiation and a second end (14), the fiber is arranged to convert the ionizing radiation received via its first end into light signals and to deliver the signals via its second end. The device further comprises filter elements (9) placed at the first end (10) of the sheath (3) to prevent external photons (v) and gamma type (γ) ionizing radiation from gaining access to the first end (7) of the scintillating fiber (4), and at the second end (14) of the scintillating fiber (4), first connection elements (16) suitable for connection to light guide elements (2) for enabling the second end (14) of the fiber to be coupled to the end (17) of a light guide (18) of the light guide elements.

27 Claims, 2 Drawing Sheets

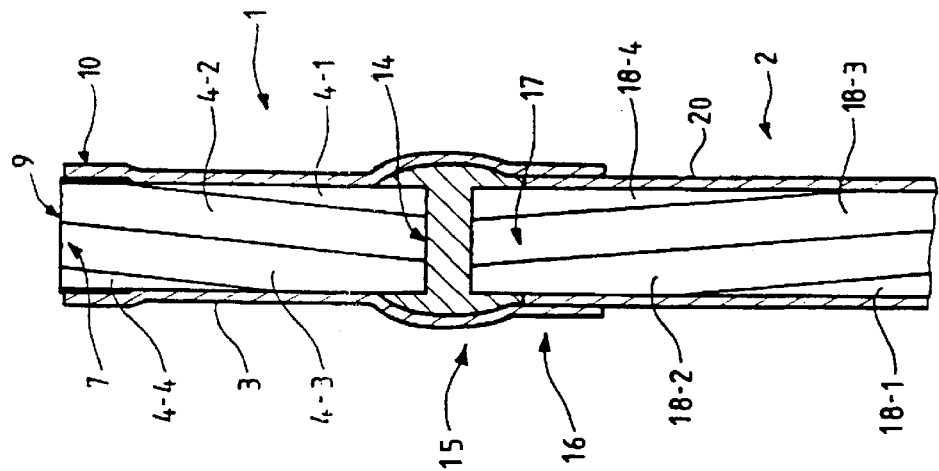
FIG_3
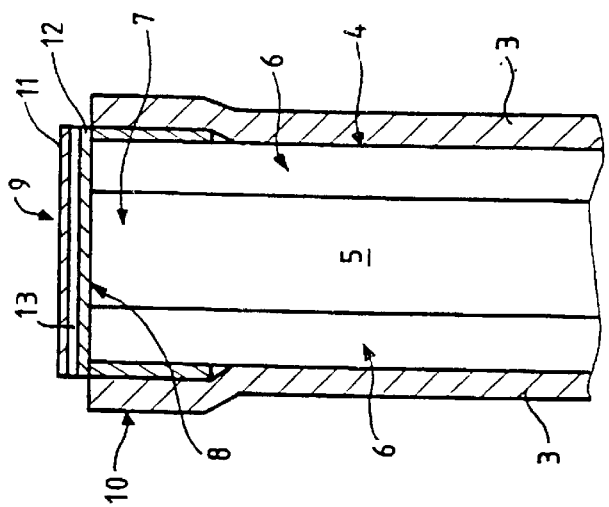
FIG_2
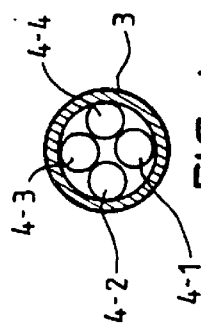
FIG_4
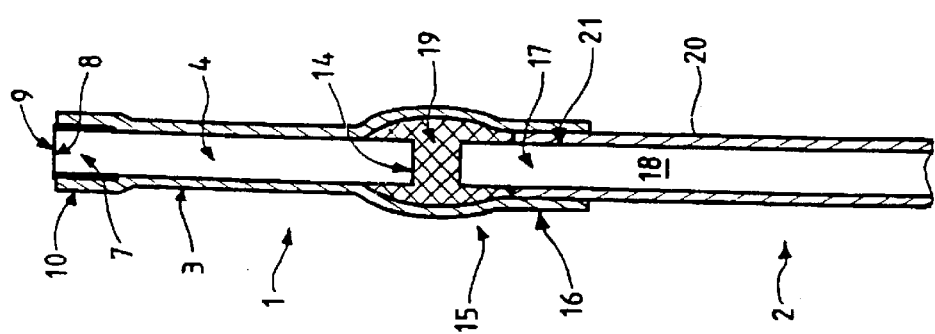
FIG_1

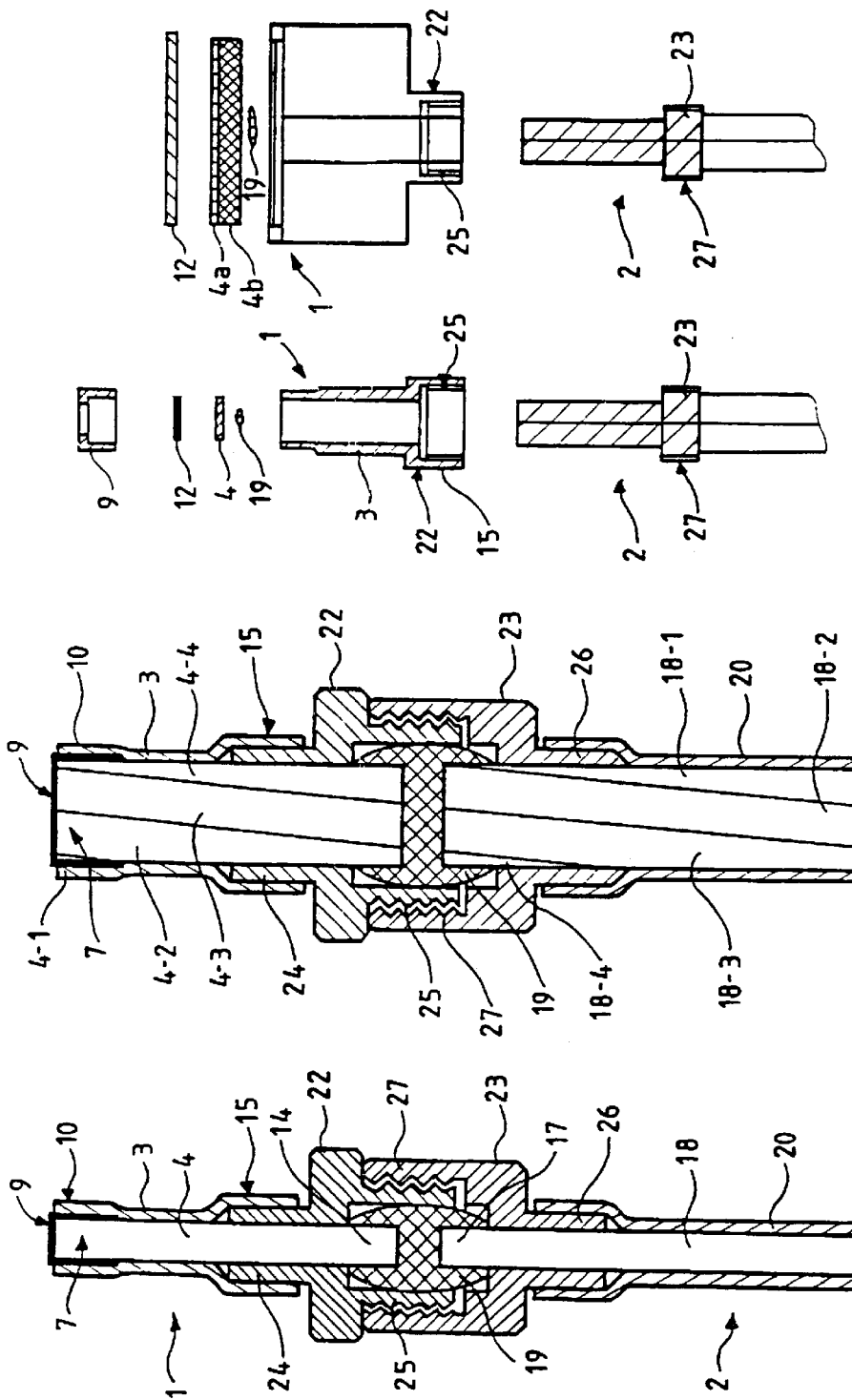

SCINTILLATION OPTICAL FIBRE DEVICE FOR COLLECTING IONIZING RADIATION

BACKGROUND OF THE INVENTION

The invention relates to collecting ionizing radiation, in particular radiation emitted by radioactive biological markers, and to converting the radiation into light signals for use by apparatus for detecting ionizing radiation.

This type of apparatus is commonly used in the medical field to locate the radioactive nuclei of (marker) molecules injected into the human body prior to surgery. One such apparatus is described in particular in European patent EP 0 650 601.

The invention relates more particularly to collection devices comprising a scintillating element housed in a sheath that is opaque to light and that has a first end arranged to receive ionizing radiation and a second end delivering light signals derived from conversion of the ionizing radiation received by the first end.

In document EP 0 650 601, the opaque sheath and the scintillating element which is a scintillating fiber are directly connected to the detector apparatus, thus requiring scintillating fibers that are several meters long. In document U.S. Pat. No. 4,788,436, the second end of the scintillating element (which is likewise a scintillating fiber) is stuck to the first end of an optical fiber whose second end is for connection to a detector apparatus to deliver thereto the light signals produced by the scintillating fiber. Consequently, the sheath extends from the first end of the scintillating fiber to the second end of the optical fiber and, as a result, it holds both the scintillating and the optical fibers captive on a permanent basis. Failure of either one of the fibers thus requires the entire collection device to be replaced.

An object of the invention is to improve the situation by providing a solution different from known solutions.

SUMMARY OF THE INVENTION

To this end, the invention provides a device for collecting ionizing radiation, the device comprising a scintillating element housed in an opaque sheath, filter means placed at the first end of the sheath to prevent at least external photons (ν) gaining access to the first end of the scintillating element, and first connection means at the second end of the scintillating element and suitable for connection to light guide means to enable said second end of the scintillating element to be coupled to the end of a light guide of said light guide means.

As a result, the collection device is an active element which is reversibly connectable to a passive light guide element (the two elements together forming a collection assembly), such that it can be replaced independently of the passive element, and its dimensions may be selected as a function of applications. In addition, since the device is not subject to interference from photons, it presents a signal/noise ratio that is considerably better than that of prior art devices, and as a result it improves the sensitivity of the detection apparatuses to which it can be connected via a passive light guide element.

Advantageously, the length of the scintillating element lies in the range about 0.1 millimeters (mm) to about 1 meter (m), and more preferably in the range about 0.1 mm and about 50 centimeters (cm), and still more preferably in the range about 0.1 mm to about 5 cm.

The connection between the active device and the passive light guide element may be provided in various ways, in particular by means of a coupling element that is preferably made of a material presenting a refractive index that is substantially equal to that of glass.

In a first embodiment, the second end of the opaque sheath extends beyond the second end of the scintillating element, to form an extension of selected length which is deformed to make the first connection means. Under such circumstances, the deformation enables at least one end of the light guide to be inserted inside the opaque sheath. The first connection means is thus in the form of a sleeve.

In a second embodiment, the first connection means is a separate part having first retention means, for example snap-fastening means or a thread for co-operating with complementary retention means formed on the second connection means of the light guide means.

The filter means are preferably made in the form of an endpiece comprising a first material in sheet form presenting weight lying in the range approximately 40 grams per square meter $(g/m^2)$ to about 300 $g/m^2$, and in particular black paper. The endpiece may also comprise a second material in sheet form serving to block ionizing radiation of the gamma ray (γ) type, e.g. mylar type polyethylene terephthalate (PET) and secured to the first material in sheet form by an intermediate bonding layer, e.g. an adhesive that is transparent to ionizing radiation, such that only beta type (β) ionizing radiation is converted.

The scintillating element may be selected from a group comprising one or more scintillating optical fibers, scintillating grains, scintillating crystals such as CsI, NaI, and BGO, a scintillating plastics material of weight preferably lying in the range about 0.8 milligrams per square centimeter $(mg/cm^2)$ to 1.6 $mg/cm^2$, a scintillating liquid, and a scintillating gel.

When the scintillating element is made up of a plurality of substantially identical scintillating fibers, it is advantageous for them to form a bundle and to be coupled to a light guide bundle of the light guide means. Under such circumstances, it can be advantageous for the filter means to comprise a zone selected to be of small extent that allows γ type and β type ionizing radiation to enter, such that the scintillating fiber can convert the received γ and β ionizing radiation into light signals.

In another embodiment, the scintillating element comprises a first portion placed downstream of the filter means to convert γ ionizing radiation into photons, and a second portion placed downstream of said first portion for converting β type ionizing radiation into photons. Under such circumstances, it is particularly advantageous for the first portion to be constituted by scintillating crystals selected from the group comprising at least CsI, NaI, and BGO, and for the second portion to be a scintillating plastics material of weight lying preferably in the range about 0.8 $mg/cm^2$ to 1.6 $mg/cm^2$.

The invention also provides an ionizing radiation collection assembly comprising light guide means suitable for being connected to a collection device of the type specified above.

BRIEF DESCRIPTION OF THE DRAWINGS

Other characteristics and advantages of the invention appear on examining the following detailed description and the accompanying drawings, in which:

FIG. 1 is a longitudinal section view of a first embodiment of a collection assembly of the invention;

FIG. 2 is an enlarged view of the first end of the device forming a portion of the assembly shown in FIG. 1;

FIG. 3 shows a variant of the assembly shown in FIG. 1;

FIG. 4 is a cross-section view through the device forming part of the assembly shown in FIG. 3;

FIG. 5 is a longitudinal section of a second embodiment of the collection assembly of the invention;

FIG. 6 shows a variant of the assembly shown in FIG. 5;

FIG. 7 is a longitudinal section of components in another variant of the collection device of the invention, prior to assembly; and FIG. 8 is a longitudinal section of components for yet another variant of the collection device of the invention, prior to assembly.

The accompanying drawings are essentially of certain character. Consequently, they serve not only to assist in describing the invention, they may also contribute to defining it, where appropriate.

DESCRIPTION OF THE PREFERRED EMBODIMENTS

In the description below, reference is made to an assembly for collecting ionizing radiation that is to be connected to an ionizing radiation detection apparatus of the type described in European patent No. EP 0 650 601.

Reference is made initially to FIG. 1 in order to describe a first embodiment of a collection device of the invention, and a collection assembly of the invention incorporating the said device.

The collection assembly comprises a collection device 1 connected to a light guide device 2.

The collection device 1 comprises a light-opaque sheath 3 having received therein a scintillating element made in the form of a scintillating fiber 4. By way of example, the scintillating fiber 4 is made of a scintillator formed by a single solute dissolved in a solvent. By way of example the solute may be (di-phenyl-4)-phenyl-6-benzoxazole (PDBO). The concentration of the solute is preferably $4 \times 10^{-3}$ grams (g) per gram of solvent, and the solvent is preferably polystyrene ($n_1 = 1.59$).

As can be seen more clearly in FIG. 2, the scintillating fiber 4 described above by way of example comprises a core 5 made of the solute and coated with a film 6 of polymethylmethacrylate (PMMA) ($n_2 = 1.49$). The thickness of such a film is about 3% of the diameter of fibers of circular section, or about 2% of the width of fibers of square section. Such fibers are sold in particular by the supplier Kurabay under the reference SCS-38 or SCSF-81.

The opaque sheath 3 is preferably about 1 mm thick.

The structure of the scintillating fiber enables it to convert β and γ type ionizing radiation into light signals that can be used by a detection apparatus. Since this physical phenomenon is well known to the person skilled in the art, it is not described in greater detail herein.

The scintillating fiber 4 has a first end 7 terminated by an inlet face 8 which is preferably polished, through which ionizing radiation emitted by the radioactive markers that are to be detected can penetrate. In the example shown in FIGS. 1 and 2, the inlet face 8 is substantially perpendicular to the longitudinal axis of the scintillating fiber. However, this inlet face 8 could be oblique, for example being formed at 45° to the longitudinal axis, or at some other angle appropriate for the intended application.

In front of the inlet face 8 of the scintillating fiber there is a filter 9 to prevent access to the scintillating fiber 4 for γ type radiation and also for photons (ν).

In the example shown in FIG. 2, the filter 9 is made in the form of an endpiece fitted onto the first end 7 of the scintillating fiber 4 so as to be held against said scintillating fiber by the first end 10 of the opaque sheath 3.

When the scintillating element is constituted by a scintillating fiber, the portion of the filter placed in register with the inlet face 8 of the scintillating fiber 4 is preferably a multi-layer structure comprising a first layer 11 for blocking γ type ionizing radiation, a second layer 12 for blocking photons, and a third layer 13 for bonding the first and second layers 11 and 12 together.

The first layer 11 is preferably made of a PET type material, such as mylar, for example. Also preferably, the second layer 12 is made of a sheet material of weight lying in the range about 40 g/m² to about 300 g/m², for example black paper or opaque plastics film of the type used for packaging high-sensitivity silver-based photographic films, typically films having sensitivity of 1000 ASA. More preferably, the sheet material presents weight of about 120 g/m². Finally, the third layer 13 is preferably an adhesive that is transparent to ionizing radiation.

The scintillating fiber 4 has a second end 14 remote from its first end 7. Similarly, the opaque sheath 3 has a second end 15 remote from its first end 10. In the embodiment shown in FIGS. 1 and 2, by way of example, the second end 15 extends beyond the second end 14 of the scintillating fiber 4 so as to form a first connection means 16. In this case, the first connection means 16 is implemented by deforming the sheath so that a first end 17 of the passive element 2 can be inserted by force into the inside of the second end 15 of the opaque sheath 3 in order to be held securely therein.

Furthermore, in order to facilitate coupling between the second end 14 of the scintillating fiber, and the first end 17 of the optical fiber 18 of the passive light guide element 2, a coupling element 19 is provided. This coupling element 19 is made of a material presenting a refractive index that is substantially equal to that of glass. It is preferably a grease, but it could also be a gel.

As shown in FIG. 1, the passive light guide element 2 preferably comprises an optical fiber 18 housed inside an opaque sheath 20 whose first end 21 is likewise received inside the portion 16 of the opaque sheath 3 forming the first connection means. This passive optical fiber may be made of a plastics material, of glass, of silica, and more generally it may be solid, or liquid, or in the form of a gel.

In order to facilitate coupling between a second end of the passive optical fiber 18 and an inlet window of a photomultiplier (PM) of a detector (not shown), the second end includes a coupling element made of a material presenting a refractive index that is substantially equal to that of glass. This material is preferably a grease, but it could also be a gel.

The dimensions of the scintillating fiber 4, and more precisely its length, are selected as a function of the intended application. Nevertheless, for reasons of efficiency in converting ionizing radiation into light signals, it is preferable for the scintillating fiber to extend over a length lying in the range about 0.1 mm to 1.50 m. More preferably, the scintillating fiber 4 extends over a length lying in the range about 0.1 mm to 50 cm, and still more preferably in a range about 0.1 mm to about 5 cm.

FIGS. 3 and 4 show a variant of the embodiment described above with reference to FIGS. 1 and 2. In this variant, the opaque sheath 3 of the collection device 1 of the invention houses a plurality of scintillating fibers (in this case four fibers 4-1 to 4-4) that are assembled together, preferably in the form of a bundle. This makes it possible to improve detection sensitivity considerably.

In this case, it is particularly advantageous for the passive light guide element 2 likewise to comprise a bundle of optical fibers 18-1 to 18-4. The number of passive optical fibers is not necessarily equal to the number of scintillating fibers.

FIG. 5 shows another embodiment of a collection assembly of the invention. This embodiment differs from the embodiment described above with reference to FIG. 1 in the connection between the collection device 1 of the invention and the passive light guide element 2.

Consequently, all of the elements which are common to both embodiments are given numerical references that are identical and they are not described again in detail.

In this example, the collection device 1 and the light guide element 2 are each provided with a respective fitted part forming first and second connection means 22 and 23, respectively.

The first connection means 22 comprises a hollow first portion 24 for receiving the second end 14 of the scintillating fiber 4. To improve retention of said first portion 24, it is inserted inside the second end 15 of the opaque sheath 3. The fitted part 22 also has a second portion 25 opposite from its first portion 24 and provided with retention means which, in this example, are implemented in the form of a thread. However they could be implemented in some other form, e.g. in the form of snap-fastening means.

The second fitted part 23 likewise has a hollow first portion 26 for receiving the first end 17 of the optical fiber of the passive light guide element 2. To reinforce retention of said second fitted part 23 on the optical fiber 18, its first portion 26 is inserted inside the opaque sheath 20 of the passive element 2. Furthermore, this second fitted part 23 has a second portion 27 opposite from its first portion 26 and provided with threaded means complementary to those carried by the first fitted part 22. Naturally, as mentioned above, the retention means formed on the second portion 27 could be snap-fastening means, or more generally shape-cooperation means.

The collection device 1 is thus connected to the passive light guide element 2 by screw-fastening.

In another variant, not shown in the figures, only the collection device need be provided with a fitted part having a second portion 25 that is provided with claws or jaws so as to grip the outside face of the opaque sheath 20 of the passive element 2.

FIG. 6 shows a variant of FIG. 5 in which the opaque sheath 3 of the collection device 1 does not contain a single scintillating fiber, but containing four scintillating fibers (4-1 to 4-4) as in the example of FIG. 3. Similarly, the passive light guide element 2 has a bundle of optical fibers 18-1 to 18-4 for collecting the light signals delivered via the second ends 14 of the scintillating fibers 4-i (i=1 to 4 in this example).

When the collection device of the invention has a multiplicity of scintillating fibers 4-i, it can be used to perform dual detection. It can be particularly advantageous for a portion of the scintillating fibers to be used for detecting ionizing radiation of the β type only, while another portion (or merely a single scintillating fiber) is used for detecting ionizing radiation of γ type or of both γ and β types.

To do this, the filter 9 may have a selected zone of small extent that does not perform the same filtering as the remainder thereof. Naturally, this selected zone needs to be placed in register with a single scintillating fiber or with a few of them, said scintillating fiber(s) being for coupling to one or more specific optical fibers that are connected to the detection apparatus separately from the other optical fibers.

As a result, it is possible to perform dual detection at the detection apparatus.

In the description above, the scintillating element is always implemented in the form of one or more scintillating fibers. However, the scintillating element could also be in numerous other forms. It could be constituted by scintillating grains or scintillating crystals preferably selected from the group comprising at least CsI, NaI, and BGO, or it could be a scintillating plastics material of weight preferably lying in the range about 0.8 mg/cm$^2$ to 1.6 mg/cm$^2$, or indeed a scintillating liquid, or a scintillating gel. By way of example, scintillating grains can be obtained by grinding up scintillating fibers.

Scintillating plastics materials are particularly advantageous when the collection device is to convert only β type ionizing radiation, it being understood that by construction they block γ type ionizing radiation. Consequently, when a scintillating plastics material is used, it suffices for the filter 9 to be arranged in such a manner as to block external photons (black paper therefore suffices). An example of a collection device having a disk of scintillating plastics material as its converter is shown in FIG. 7, prior to assembly.

In a variant shown in FIG. 8, the device serves to convert both β and γ ionizing radiation. The scintillating element for conversion purposes is implemented in this case as two portions. The first portion 4a is placed downstream from the filter 9 and converts β type ionizing radiation into photons. It is preferably a scintillating plastics material. The second portion 4b is placed downstream from the first portion 4a and converts γ type ionizing radiation into photons. It is preferably constituted by CsI or NaI or BGO crystals.

It is clear that in this variant, the filter 9 need only block photons. Consequently, a layer 12 of black paper suffices.

In the two variants shown in FIGS. 7 and 8, the collection device and the light guide element 2 are provided with respective fitted parts constituting the first and second connection means 22 and 23 respectively. These are substantially equivalent in type to those described above with reference to FIG. 5. The collection device 1 is connected to the passive light guide element 2 by screw-fastening.

The invention also provides the use of a collection device and a collection assembly, as described above, for detecting cells, or glands, or tumors, or metastases that contain radioactive nuclei (or markers) suitable for radiating ionizing radiation.

The invention is not limited to the embodiments of the device and the assembly as described above, merely by way of example, and it covers any variant that the person skilled in the art might envisage in the ambit of the following claims.

What is claimed is:

1. A device (1) for collecting ionizing radiation, comprising:

an opaque sheath (3) with first and second ends (10, 15);

a scintillating element (4) housed inside the opaque sheath, having a first end (7) suitable for receiving ionizing radiation and a second end (14) opposite its first end, the scintillating element being arranged to convert the ionizing radiation received via its first end into light signals and to deliver said signals through its second end;

filter means (9) placed at the first end (10) of the sheath (3) to prevent at least external photons (v) gaining access to the first end (7) of the scintillating element (4); and first connection means (16; 22) at the second end (15) of the opaque sheath (3) and suitable for connection to light guide means (2) to enable said second end (14) of the scintillating element to be coupled to a light guide (18) of said light guide means.

2. A device according to claim 1, characterized in that the second end (14) of the scintillating element (4) is coupled to said light guide (18) via a coupling element (19).

3. A device according to claim 2, characterized in that the coupling element (19) is made of a material presenting a refractive index that is substantially equal to that of glass.

4. A device according to claim 1, characterized in that said second end (15) of the opaque sheath (3) extends beyond the second end (14) of the scintillating element (4) to form an extension of selected length, and in that said first connection means (16) is made by deforming said extension of the opaque sheath (3), said deformation being suitable for enabling at least one end (17) of the light guide (18) to be inserted inside the opaque sheath (3).

5. A device according to claim 1, characterized in that said first connection means (22) is a fitted part having first retention means (25) suitable for being connected to said light guide means (2).

6. A device according to claim 5, characterized in that said first retention means (25) are snap-fastening means suitable for co-operating with complementary second retention means (27) formed on second connection means (23) of the light guide means (2).

7. A device according to claim 5, characterized in that the first retention means (25) have a thread suitable for co-operating with a corresponding thread (27) formed on second connection means (23) of the light guide means (2).

8. A device according to claim 5, characterized in that said first connection means (22) comprise a hollow portion (24) suitable for closely receiving the second end (14) of the scintillating element (4) and for being covered at least in part by the second end (15) of the opaque sheath (3).

9. A device according to claim 1, characterized in that the second material in sheet form (11) is of the polyethylene terephthalate type, and the bonding layer (13) is an adhesive that is transparent to ionizing radiation.

10. A device according to claim 1, characterized in that the scintillating element is selected from a group comprising one or more scintillating optical fibers, scintillating grains, scintillating crystals selected from the group comprising at least CsI, NaI, and BGO, a scintillating plastics material, a scintillating liquid, and a scintillating gel.

11. A device according to claim 10, characterized in that said scintillating element has a first portion (4a) placed downstream from the filter means and suitable for converting γ type ionizing radiation into photons, and a second portion (4b) placed downstream from said first portion and suitable for converting β type ionizing radiation into photons.

12. A device according to claim 11, characterized in that the first portion (4a) is constituted by scintillating crystals selected from the group comprising at least CsI, NaI, and BGO, and the second portion (4b) is a scintillating plastics material.

13. A device according to claim 1, characterized in that the scintillating element is made up of a plurality of substantially identical scintillating fibers (4-i) arranged in a bundle and suitable for being coupled to a bundle of light guides (18-i) of the light guide means (2).

14. A device according to claim 1, characterized in that the scintillating element (4) extends over a length lying substantially in the range about 0.1 mm to about 1 m.

15. A device according to claim 1, characterized in that the scintillating element (4) extends over a length lying substantially in the range about 0.1 mm to about 50 cm.

16. A device according to claim 1, characterized in that the scintillating element (4) extends over a length lying substantially in the range about 0.1 mm to about 5 cm.

17. The use of a collection device according to claim 1 for detecting cells, or organs, or tumors, or metastases containing radioactive nuclei suitable for radiating ionizing radiation.

18. A device (1) for collecting ionizing radiation, comprising:
an opaque sheath (3) with first and second ends (10, 15);
a scintillating element (4) housed inside the opaque sheath, having a first end (7) suitable for receiving ionizing radiation and a second end (14) opposite its first end, the scintillating element being arranged to convert the ionizing radiation received via its first end into light signals and to deliver said signals through its second end;
filter means (9) placed at the first end (10) of the sheath (3) to prevent at least external photons (v) gaining access to the first end (7) of the scintillating element (4); and
first connection means (16; 22) at the second end (14) of the scintillating element (4) and suitable for connection to light guide means (2) to enable said second end (14) of the scintillating element to be coupled to a light guide (18) of said light guide means,
wherein said filter means (9) are made in the form of an endpiece having a first material in sheet form (12) presenting weight lying in the range 40 g/m² to 300 g/m², and in particular black paper.

19. A device according to claim 18, characterized in that said endpiece (9) has a second material in sheet form (11) suitable for blocking γ type ionizing radiation and secured to the first material in sheet form (12) via an intermediate bonding layer (13).

20. A device according to claim 19, wherein the scintillating element is made up of a plurality of substantially identical scintillating fibers arranged in a bundle, characterized in that said filter means (9) include a selected zone of small extent arranged to allow γ type and β type ionizing radiation to enter into the first end of at least one of the scintillating fibers (4-i) of the bundle, such that said scintillating fiber can convert received γ and β ionizing radiation into light signals.

21. An assembly for collecting ionizing radiation, comprising:
light guide means (2) suitable for being connected to a device for collecting ionizing radiation (1), the device for collecting ionization radiation comprising, an opaque sheath (3) with first and second ends (10, 15);
a scintillating element (4) housed inside the opaque sheath, having a first end (7) suitable for receiving ionizing radiation and a second end (14) opposite its first end, the scintillating element being arranged to convert the ionizing radiation received via its first end into light signals and to deliver said signals through its second end;
filter means (9) placed at the first end (10) of the sheath (3) to prevent at least external photons (v) gaining access to the first end (7) of the scintillating element (4); and
first connection means (16; 22) at the second end (14) of the opaque sheath and suitable for connection to light guide means (2) to enable said second end (14) of the scintillating element to be coupled to a light guide (18) of said light guide means.

22. An assembly according to claim 21, characterized in that the light guide means (2) include second connection means (23) suitable for co-operating with the first connection means (22) of the device (1).

23. An assembly according to claim 22, characterized in that said second connection means (23) is a fitted part suitable for co-operating with another fitted part (22) forming the first connection means of the collection device (1).

24. An assembly according to claim 23, characterized in that the second connection means (23) has snap-fastening means suitable for co-operating with complementary snap-fastening means of the first connection means (22) of the collection device (1).

25. An assembly according to claim 23, characterized in that the second connection means (23) has a thread (27) suitable for co-operating with a complementary thread (25) of the first connection means (22) of the collection device (1).

26. An assembly according to claim 21, characterized in that the light guide means have an end facing the collection device (1) and provided with a material presenting a refractive index substantially equal to that of glass.

27. The use of a collection assembly according to claim 21 for detecting cells, or organs, or tumors, or metastases containing radioactive nuclei suitable for radiating ionizing radiation.

* * * * *